March 25, 1952  G. H. LAGHER  2,590,420
TOOLHEAD WITH ADJUSTMENT INDICATOR
Filed Sept. 23, 1946  3 Sheets-Sheet 1

Inventor
G. H. Lagher
By
Attys.

March 25, 1952  G. H. LAGHER  2,590,420
TOOLHEAD WITH ADJUSTMENT INDICATOR
Filed Sept. 23, 1946  3 Sheets-Sheet 2

Inventor
G. H. Lagher

March 25, 1952  G. H. LAGHER  2,590,420
TOOLHEAD WITH ADJUSTMENT INDICATOR
Filed Sept. 23, 1946  3 Sheets-Sheet 3

Inventor
G. H. Lagher
By Glascock Downing &c
Attys.

Patented Mar. 25, 1952

2,590,420

UNITED STATES PATENT OFFICE 2,590,420

TOOLHEAD WITH ADJUSTMENT INDICATOR

Gunnar Hjalmar Lagher, Skanes Viby, Sweden, assignor to Helmer Hoog, Stockholm, Sweden Application September 23, 1946, Serial No. 698,704
In Sweden July 6, 1945

Section 1, Public Law 690, August 8, 1946
Patent expires July 6, 1965

11 Claims. (Cl. 177—311)

This invention relates to a new and useful improvements in tool holders and has particular relation to rotatable boring heads. In the preferred example illustrated the rotatable boring head has a body with a radial guide, a tool carrying block adjustable in said guide, a screw having threaded connection with the block and adapted to be rotated to adjust the block relatively to the body, a gear member coaxial with the head axis and normally stationary on the body so as to rotate therewith and movable relatively to the body, and a gearing connection between said member and said screw.

The object of the invention is to provide such a head with a signal device to make a signal every time said block is adjusted a fixed distance.

Other objects and advantages will become apparent from a consideration of the following detailed description taken in connection with the accompanying drawings wherein a preferred embodiment of the invention is shown. However, it is to be understood that the invention is not limited to the details disclosed but includes all such variations and modifications as fall within the spirit of the invention and the scope of the appended claims.

Figure 1:
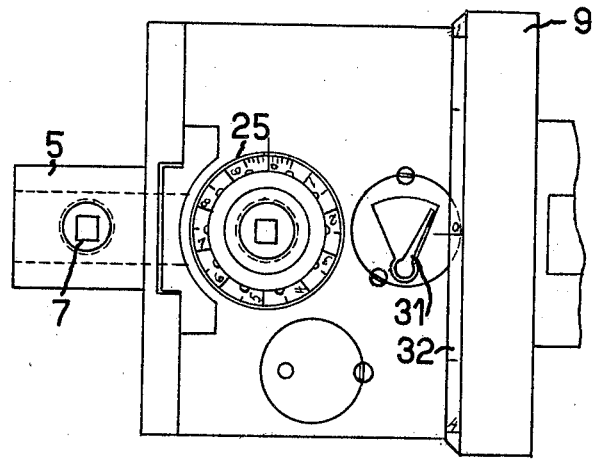
Fig. 1 is a side view of a boring head constructed according to the present invention.
Figure 2:
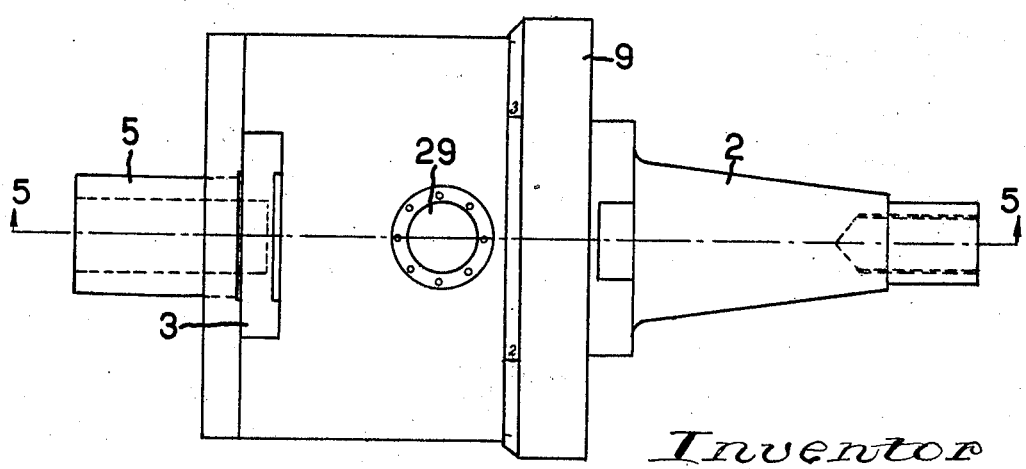
Fig. 2 is a side view of the boring head turned through 180°.
Figure 3:
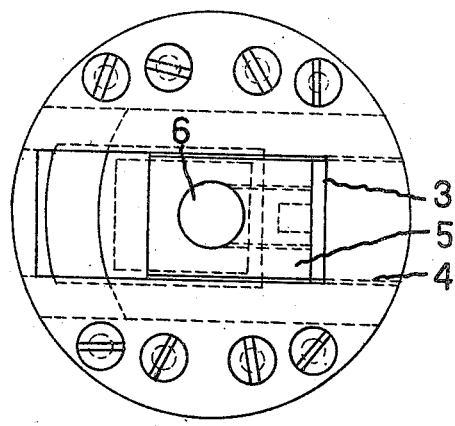
Fig. 3 is a left end view of the boring head.
Figure 4:
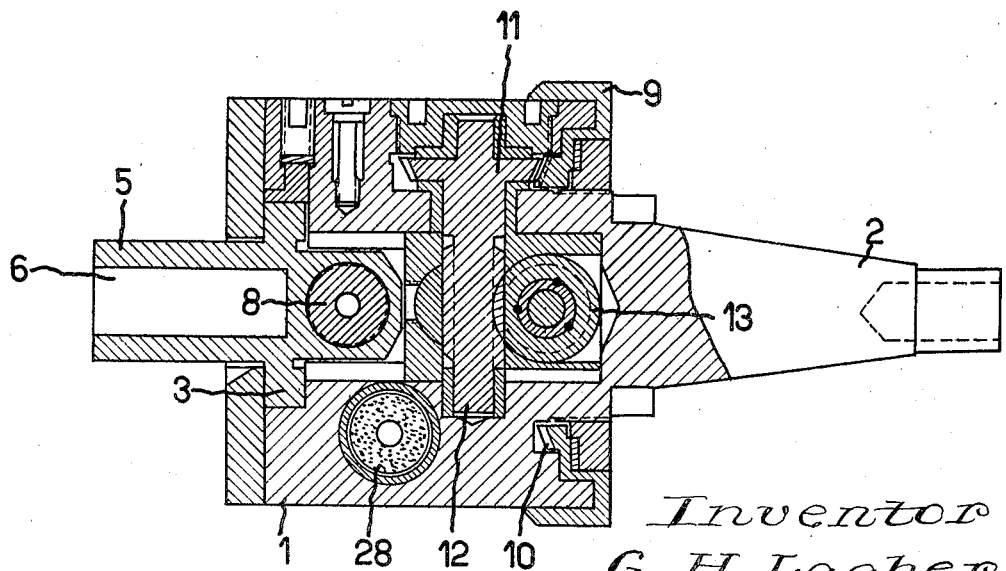
Fig. 4 is a sectional side view of the boring head.
Figure 6:
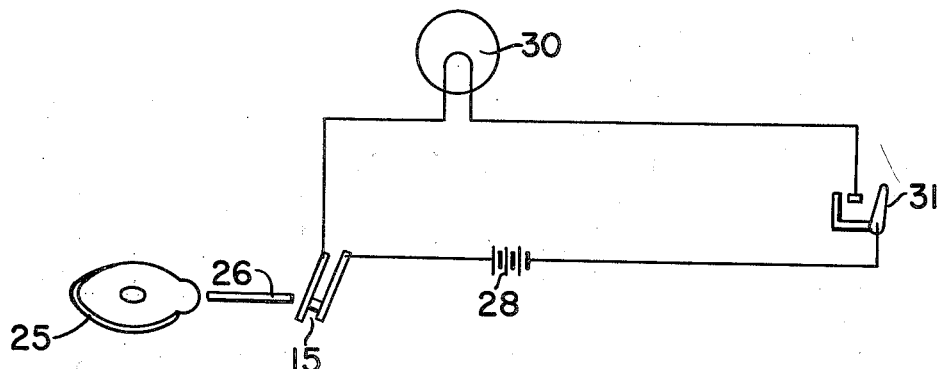
Fig. 6 is a schematic electrical wiring diagram for the indicator circuit.

Referring in detail to the drawings, the improved boring head is shown as including a body 1, from the right end of which protrudes a tapered stem 2, the outer end of which is adapted to be inserted into any suitable tool holder or chuck by which the boring head will be rotated. In the left end of the body there is a transverse slot or guideway 4, in which there is slidably mounted a tool carrying block 3 which is adapted to be adjusted radially in said slot as will later appear. A protruding hub 5 of the block 3 has an axial opening 6 to receive the shank of a boring tool (not shown), the shank being secured in place by means of a clamping screw 7, threaded into a radial hole in said protruding hub 5.

A screw 8 is threaded through the block 3. When screw is turned about its longitudinal axis the tool carrying block 3 will be fed or adjusted in one direction or the other along said guideway 4 so as to vary the eccentricity of the tool holding opening 6 and thereby of the tool (not shown), and thus to vary the diameter of the hole that is bored.

In the right portion of the body 1 and coaxially with the axis of the head there is a gear ring 9 having tapered gear teeth 10 meshing with a tapered gear 11. Integral with the gear 11 is a worm gear 12 meshing with a worm gear 13. Said worm gear 13 is rigidly connected to the same shaft as a smaller gear 14, said gear 14 meshing with a gear 27. The gear 27 meshes with another gear 16 which gear is arranged coaxially with the screw 8. Inserted in a transverse hole 17 in the screw 8 is an arm 18, the two outer ends of which are shaped as tapered pins protruding in the longitudinal direction of the screw and entering into tapered recesses in the end surface of the gear 16. Inserted in a central aperture of the screw 8 is a compression spring 22, said spring pressing the arm 18 towards the gear 16, the gear being thereby yieldingly connected to the screw 8.

During normal operation of the boring head the gears, above described, move together as an unit with the body 1 so that there is no relative movements of said gears and consequently there is no adjustment of the screw 8. When the tool is to be adjusted either for a larger or a smaller hole the normally stationary gear ring 9 is manually turned. This may be accomplished while the boring head is running and in operation and the manual adjustment or turning of the normally stationary gear ring 9 imparts extra movement to the gear 11 and through it to the worm gear 12, the gears 13 and 14, the gears 27 and 16 to the screw 8 the latter acting on the tool carrying block 3, thereby adjusting said block in a lateral direction. When during this operation the tool carrying block arrives at either of its limits of travel, breakage of the device is prevented by the tapered end pins 19 of the arm 18 being forced out of the tapered recesses 20, the screw 8 thereby no longer being rotated by the gear 16.

Figure 5:
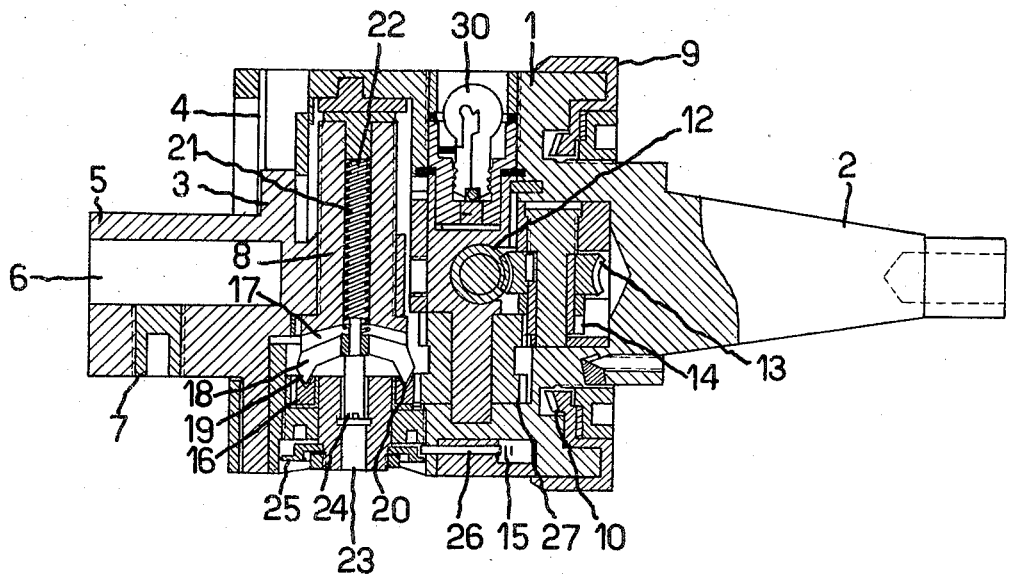
Fig. 5 is a sectional view taken substantially along the plane of the line 5—5 in Fig. 2.

In one end of the screw 8, shown in Fig. 5 as directed downwardly and accessible from outside, there is a square sectional aperture 23. By inserting into said aperture a key (not shown) and pressing said key against a pin 24, which pin is slidably mounted in the aperture 23 abutting the arm 18, the tapered pins 19 of the arm 18 are forced out of the recesses 20 in the gear 16. Now by turning the key the screw 8 is turned independently of the gears 16, 27, 14, 13, the worm gear 12, the gear 11 and the ring gear 9, and a rapid lateral adjustment of the tool is attained.

If the pitch of the screw 8 is one milli-meter, each revolution of said screw corresponds to a lateral adjustment of the tool carrying block 3 and of the tool of 1 milli-meter. The outer end of the screw 8 consists of a graduated ring 25 having scale lines from 0 to 10 thereon. Each space between the lines therefore corresponds to a lateral adjustment of the tool of one-tenth milli-meter. The gear transmission between the ring gear 9 and the screw 8 has such a ratio that one revolution of the screw 8 corresponds to a lateral adjustment of the tool of five-thousandths milli-meter.

Once during each revolution of the screw 8 a lateral protruding portion of the graduated ring 25 engages a pin 26, said pin hereby being pushed in transverse direction in relation to the screw and thereby actuating a switch 15. This switch then closes a circuit comprising a flash light battery 28, the switch 15 itself, another switch (not shown), and a signal lamp 30, which lamp is visible through a window 29. When the boring head is running and lateral adjustment of the tool is performed by manually holding the gear ring 9, each flash of the lamp 30 corresponds to a lateral adjustment of one milli-meter of said tool. By counting the numbers of the flashes the operator is informed of the degree of said lateral adjustment.

The signal lamp may be replaced by any other type of signal device which will make a signal each time said switch 15 closes the circuit.

The other switch may be operated by means of an arm 31, as shown in Fig. 1, between one position, in which said switch holds the circuit open, and another position, in which said circuit is closed.

What I claim is:

1. In a tool head, a rotatable body having a radial guide, a tool holder adjustable in said guide, a member rotatable in said head and operable to move the holder in the guide in degree proportional to the angular movement of said member, an adjusting member mounted on said body, a transmission including gears connecting said two members, an indicator circuit, a contact device mounted on said body and controlling the closing of said circuit, and operating means for the contact device actuated periodically by one of the gears in said transmission during movement of the tool holder.

2. An arrangement as claimed in claim 1 provided with a yieldable drive coupling between said rotatable member and one of the gears of said transmission, means for rendering said coupling ineffective whereby said rotatable member may be operated independently of said adjusting member.

3. An arrangement as claimed in claim 1 provided with a yieldable drive coupling between said rotatable member and one of the gears of said transmission, means for rendering said coupling ineffective whereby said rotatable member may be operated independently of said adjusting member, said operating means being permanently connected with said rotatable member and operable thereby.

4. An arrangement as claimed in claim 1 provided with manually operable means for rendering the contact device ineffective.

5. In a rotatable boring head, a body having a radial guide, a tool carrying block adjustable in said guide, a screw having threaded connection with the block and adapted to be rotated to adjust the block relative to the body, a gear member coaxial with the head axis and normally stationary on the body so as to rotate therewith and movable relatively to the body, a gearing connection between said member and said screw, a signal device mounted in the boring head, a circuit making and breaking device operated by said gearing connection, and electrical connections between said circuit making and breaking device and said signal device and said screw as to actuate the signal device to make a signal each time said block being adjusted a fixed distance.

6. In a rotatable boring head as claimed in claim 5, said screw being arranged to actuate the signal device to make a signal once a revolution of said screw.

7. In a rotatable boring head as claimed in claim 5, said gearing connection between said member and said screw including a yielding member in order to prevent breakage of the device, when during operation said block arrives at one of its end stops.

8. In a rotatable boring head as claimed in claim 5, said gearing connection between said member and said screw including a yielding member in order to prevent breakage of the device, when during operation said block arrives at one of its end stops, and means for rendering said yielding member ineffective whereby said screw may be operated independently of said adjusting member.

9. In a rotatable boring head, a body having a radial guide, a tool carrying block adjustable in said guide, a screw having threaded connection with the block and adapted to be rotated to adjust the block relatively to the body, in a transverse hole in said block is an arm, the two outer ends of which being shaped as tapered pins protruding in the longitudinal direction of said screw and entering into tapered recesses in the end surface of a gear coaxial with said screw, inserted in a central aperture of said screw in a spring, said spring pressing said arm towards said gear hereby yieldingly connecting the screw to said gear, further a member coaxial with the head axis and normally stationary on the body so as to rotate therewith and movable relatively to the body, a gearing connection between said gear member and said gear, a signal device mounted in the boring head, a circuit making and breaking device operated by said gearing connection, and electrical connections between said circuit making and breaking device and said signal device and to actuate the signal device to make a signal each time said block being adjusted a fixed distance.

10. In a rotatable boring head as claimed in claim 9, a central hole in said gear coaxial with said screw, said aperture in the screw being adapted to receive a key inserted through the hole in said gear, said key thereby forcing said arm in axial direction relative said screw, the pins of the arm threby being forced out of the recesses in said gear, whereby said screw may be operated by means of the key independently of said gear member.

11. In a rotatable boring head, a rotatable body having a diametral guideway therein, a tool carrying block slidably mounted in said guideway, a screw journalled chordally of said body and in mesh with said tool carrying block so as to adjust same diametrically of the boring head, a ring rotatably mounted on said boring head, a gear transmission between said ring and said screw and terminating in a gear member rotatably journalled concentrically with respect to said screw, said latter gear member having a central aperture therein and a clutch face adjacent the screw, a transverse slot in the end of said screw adjacent the latter gear member, a spring biased clutch member in said transverse slot slidably mounted with respect to and rotatably engaged with said screw and engageable with the clutch face on the terminal gear member, a graduated ring on said terminal gear member, a circuit making and breaking device operated by said graduated ring, an indicating device mounted in a bore in said boring head, a circuit including said circuit breaking and making device, said indicating device and a battery, whereby said clutch member may be disengaged from the clutch face on the terminal gear member by a key inserted through the central aperture in the terminal gear member and the screw rotated to adjust the tool carrying block diametrically of the boring head without operating the circuit making and breaking device and the indicating device.

GUNNAR HJALMAR LAGHER.

REFERENCES CITED

The following references are of record in the file of this patent:

UNITED STATES PATENTS

| Number | Name | Date |
| --- | --- | --- |
| 1,249,642 | Lindfors | Dec. 11, 1917 |
| 1,788,793 | Hall | Jan. 13, 1931 |
| 2,093,743 | Steiner | Sept. 21, 1937 |
| 2,209,867 | Wolhupter | July 30, 1940 |
| 2,465,735 | Liberherr | Mar. 29, 1949 |

FOREIGN PATENTS

| Number | Country | Date |
| --- | --- | --- |
| 78,659 | Sweden | of 1932 |
| 434,183 | Germany | Sept. 22, 1926 |